United States Patent [19]

Flippo

[11] Patent Number: 5,147,025
[45] Date of Patent: Sep. 15, 1992

[54] EXPANDABLE POWERED ROLLER CONVEYOR

[75] Inventor: Bobby K. Flippo, Jonesboro, Ark.

[73] Assignee: Northstar Industries, Inc., Jonesboro, Ark.

[21] Appl. No.: 642,012

[22] Filed: Jan. 16, 1991

[51] Int. Cl.⁵ .............................................. B65G 13/02
[52] U.S. Cl. .............................. 198/782; 193/35 TE; 198/790
[58] Field of Search .................... 193/35 TE; 198/581, 198/588, 594, 632, 782, 812, 861.1, 790; 414/529, 532

[56] References Cited

U.S. PATENT DOCUMENTS

| | | | |
|---|---|---|---|
| 1,841,278 | 1/1932 | Dallas | 248/277 |
| 1,849,205 | 3/1932 | Rypinski | 198/632 |
| 2,590,359 | 3/1952 | Zopf | 198/632 |
| 2,796,969 | 6/1957 | Russel | 198/588 |
| 2,826,290 | 3/1958 | Barski | 193/35 TE |
| 2,897,955 | 8/1959 | Morrow | 198/830 |
| 2,988,190 | 6/1961 | Tucker | 193/35 TE |
| 3,117,662 | 1/1964 | Wahl et al. | 193/37 |
| 3,139,173 | 6/1964 | Greaves | 198/632 |
| 3,258,097 | 6/1966 | Wahl | 193/37 |
| 3,276,558 | 10/1966 | Guske et al. | 193/35 TE |
| 3,944,037 | 3/1976 | Stease | 193/35 TE |
| 4,164,338 | 8/1979 | Myron | 414/529 X |
| 4,266,650 | 5/1981 | Patel et al. | 193/35 TE |
| 4,297,753 | 11/1981 | Langren | 198/632 X |
| 4,852,712 | 8/1989 | Best | 193/35 TE |
| 4,860,878 | 8/1989 | Mraz et al. | 198/812 X |

FOREIGN PATENT DOCUMENTS

| | | | |
|---|---|---|---|
| 10067970 | 4/1957 | Fed. Rep. of Germany . | |
| 0045815 | 3/1986 | Japan | 198/594 |
| 0075725 | 4/1986 | Japan | 198/782 |
| 9008717 | 8/1990 | PCT Int'l Appl. | 198/812 |
| 2012700 | 8/1979 | United Kingdom . | |
| 2147866 | 5/1985 | United Kingdom | 198/812 |

*Primary Examiner*—Robert P. Olszewski
*Assistant Examiner*—Cheryl L. Gastineau
*Attorney, Agent, or Firm*—Kilpatrick & Cody

[57] ABSTRACT

Powered roller conveyors, which may be expandable and/or flexible. One or more drive belts (tubing or chain) extends across drive rollers and smaller-diameter guide rollers or sheaves on the top surface of the conveyor, and under followers located beneath the top surface of the conveyor. In the expandable and flexible conveyor version, the followers are located from the drive and guide rollers approximately the same distance as the connections between bars in the lazy tong structures forming the supports for the conveyor so that as the lazy tong structures expand, the segments of the drive belt between guide and drive rollers on the one hand and the followers on the other hand, remain substantially constant, thus allowing the drive belts to power their conveyor at any desired expanded length. Such belts may be used with conveyors that feature only axles to support the rollers on their top surfaces, with conveyors that use axles and additional strengthening structures such as braces and roller clips, and with conveyors which do not include lazy tong structures but instead use C-beams, I-beams or similar longitudinal structural members to support the axles and rollers. One or more drive belts may be used. Skate wheel type rollers or long rollers may also be used.

25 Claims, 4 Drawing Sheets

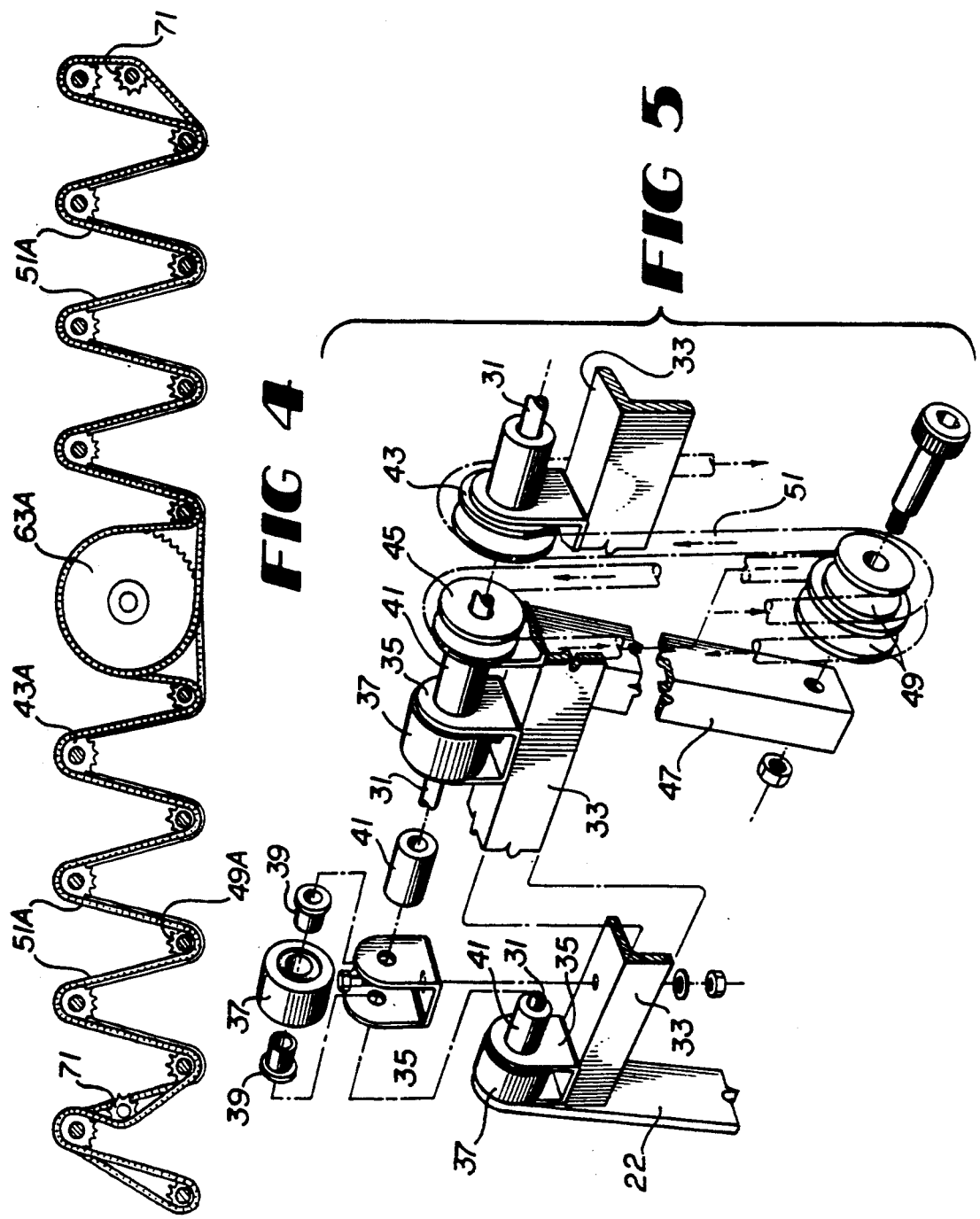

EXPANDABLE POWERED ROLLER CONVEYOR

This invention relates to flexible and expandable powered rollered conveyors.

BACKGROUND OF THE INVENTION

Flexible expandable roller conveyors which utilize lazy tong support frames or structures have been widely used for many years. Lazy tongs are structures formed of a set of parallel bars, each of which is pivotally connected at its end points and, in some cases, at its midpoint to corresponding bars in a transversely oriented set of parallel bars so that the structure may be extended and retracted with scissor-like action. Such structures for conveyors are disclosed in U.S. Pat. No. 3,276,558 issued Oct. 4, 1966 to Guske, et al. and U.S. Pat. No. 4,266,650 issued May 12, 1981 to Patel, et al., which are incorporated herein by this reference. The conveyors of those patents include lazy tong structures which are spanned and connected by a number of axles or rods, each of which carries several rollers. Such conveyors are sometimes known as "skate wheel" conveyors because their rollers are, or are similar in construction and appearance to, roller skate wheels.

Lazy tong roller conveyors are particularly useful to move packages and other items from one point to other points in a plant or warehouse, and in loading or unloading trucks, airplanes or containers. They be flexed and extended or retracted with minimum effort to accommodate the desired location, vehicle or container.

U.S. Pat. No. 4,852,712 issued Aug. 1, 1989 to Best, which is incorporated by this reference, discloses a flexible, expandable roller conveyor formed of lazy tong structures. The conveyor employs not only roller axles but also braces rigidly connected to corresponding bars in the lazy tong structures to span the lazy tong structures and support the rollers. The conveyor is more durable and resistent to abuse than previous conveyors because the braces help support the rollers and axles and thus minimize axle bending and deformation which normally occurs in conventional roller conveyors.

The nature of the lazy tong structure allows such conveyors to be retracted and stored in a compact fashion in which successive axles and rollers are positioned nested together immediately adjacent to one another. The distance between successive axles and rollers increases as the roller is expanded to its operative position for conveying articles. The expandable and retractable nature of such conveyors has conventionally precluded using a drive belt for moving articles, so that workers are required to propel articles carried by the conveyors.

SUMMARY OF THE INVENTION

The present invention provides lazy tong flexible and expandable roller conveyors which include one or more drive belts or chains (for convenience hereinafter referred to simply as "belts" or "drive belts") that help propel articles along the conveyor surface. The drive belt or belts are interlaced over drive rollers and guide rollers on the top surface of the conveyor, and under followers located below the top surface, in a continuous loop. As the conveyor is expanded or retracted, the interlaced belts retain approximately their same length and thus are able to ride the drive rollers on the top surface and conveyor packages at any desired conveyor length or curve.

Conveyors of the present invention may contain one or more drive belts. Each belt may extend over drive rollers located on alternating axles which span the lazy tong structures, and under corresponding followers positioned at approximately the same distance from the drive rollers as the connections between bars in the lazy tong structure. Separate belts may ride drive rollers mounted on staggered, separate sets of axles, or the drive rollers for two belts may be mounted on the same axles.

A drive motor or other drive means may be located in the midportion of the conveyors, at either end or as otherwise desired, and may be connected via a drive pulley or pulleys to the belt.

Structure of the present invention may include or omit the braces and additional structure disclosed in the Best patent mentioned above, and thus adapt well to conventional flexible, expandable conveyors which have been in use for many years.

Similarly, skate wheels or conventional long conveyor rollers may be used. In the long roller application, the drive belts may apply power to sheaves connected to the rollers, which propel the articles along the conveyor.

The present invention may also be used with rigid conveyors which are not expandable and which simply includes a top surface of rollers (skate wheel or long rollers) supported by axles, whether or not supported by lazy tongs or other expandable structures.

It is therefore an object of the present invention to provide roller conveyors which are powered by one or more belts that move or propel articles along the conveyor top surface at any desired retracted or extended position.

It is an additional object of the present invention to provide flexible, expandable powered roller conveyors which use axles and braces to support rollers.

It is an additional object of the present invention to provide flexible, expandable powered roller conveyors which include only axles to support the rollers.

Other objects, features and advantages of the present invention will become apparent with reference to the remainder of this document.

BRIEF DESCRIPTION OF THE DRAWINGS

FIG. 4 is a schematic side plan view of a drive pulley connected to drive belts of a conveyor of the present invention.

FIG. 5 is an exploded perspective view of an axle and brace assembly with rollers of the conveyor of FIGS. 1 and 3.

DETAILED DESCRIPTION OF THE DRAWINGS

Figure 1:
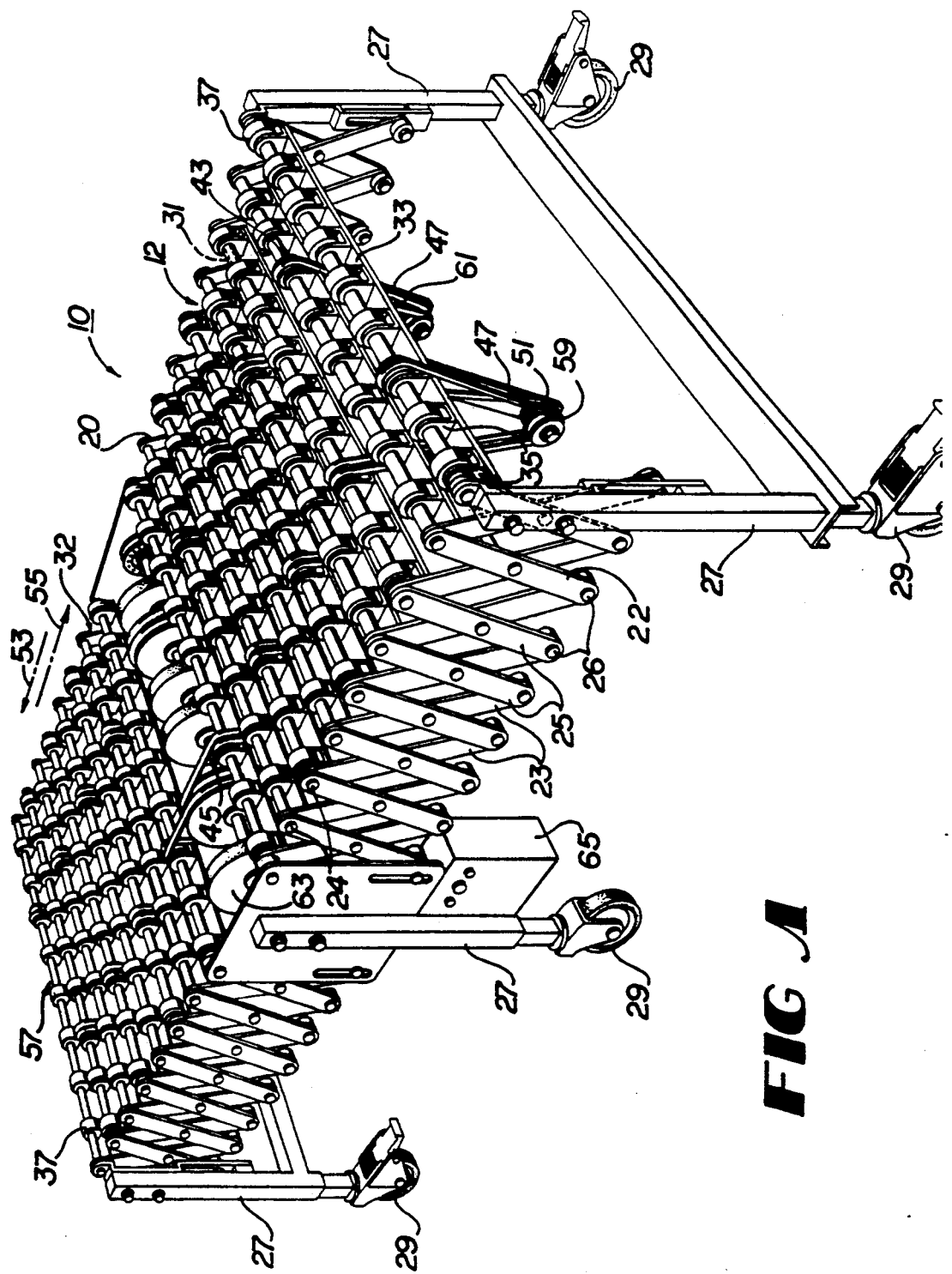
FIG. 1 is a perspective view of a first embodiment of a conveyor according to the present invention which includes drive means located at the midportion and includes braces as well as axles to support rollers.

FIG. 1 is a perspective view of a preferred embodiment of a conveyor 10 according to the present invention. This embodiment of conveyor 10 has an expandable section 12 which is formed of two or more lazy tong structures 20. Each lazy tong structure 20 is formed of two sets of parallel oriented bars 22, the top of each bar in the first set 23 being pivotally connected to the top of a bar in a second set 25, the bottom of each bar in the first set 23 being pivotally connected to the bottom of a bar in the second set 25. The bottom pivotal connections 24 are preferably formed of nuts and bolts, but may be rivets or any other desired fasteners. A first variety of lazy tong structure 20 requires that the midportions of each bar in the first set 23 be pivotally connected to the midportion of a bar in the second set 25, but the lazy tong structures need not include the middle connection.

Additionally, the present invention may be used with conveyors which include no lazy tong structures, but which simply use longitudinal strength members such as C-beams or I-beams to support rollers and axles, together with additional structure.

The lazy tong structures may be supported with a plurality of legs 27 which may be connected to a top pivotal connection 24 and slidably connected to a bottom pivotal connection 26. Legs 27 may be attached to casters 29 or other rollers, which may, but need not, contain braking mechanisms. Legs 27 may also be extendable as shown in FIG. 1.

Spanning the lazy tong structures 20 in the embodiment shown in FIG. 1 are a plurality of axles 31. Axles 31 preferably span between the top portions of each bar 22 in the first and second sets 23 and 25. The axles may themselves supplant nuts and bolts as the fasteners for top pivotal connections 24. In one embodiment, for instance, each axle 31 contains at its extremities a pair of scores which may capture snap rings or other retainers to form the pivotal connection 24.

According to the embodiment shown in FIG. 1, each axle 31 cooperates with a corresponding brace 33 and a number of roller clips or supports 35 to support rollers 37. This structure is described in detail in the Best patent mentioned above and incorporated herein by this reference. Briefly, as shown in FIG. 5, brace 33 may be connected to a corresponding bars 22 in a first or second set 23 or 25 in each lazy tong structure. Each brace 33 supports a number of the roller supports 35, which are attached by nuts and bolts or other desired means. The axle 31 extends between holes in the roller supports 35, and threads the rollers 37, their bearings 39 and spacers 41.

Figure 3:
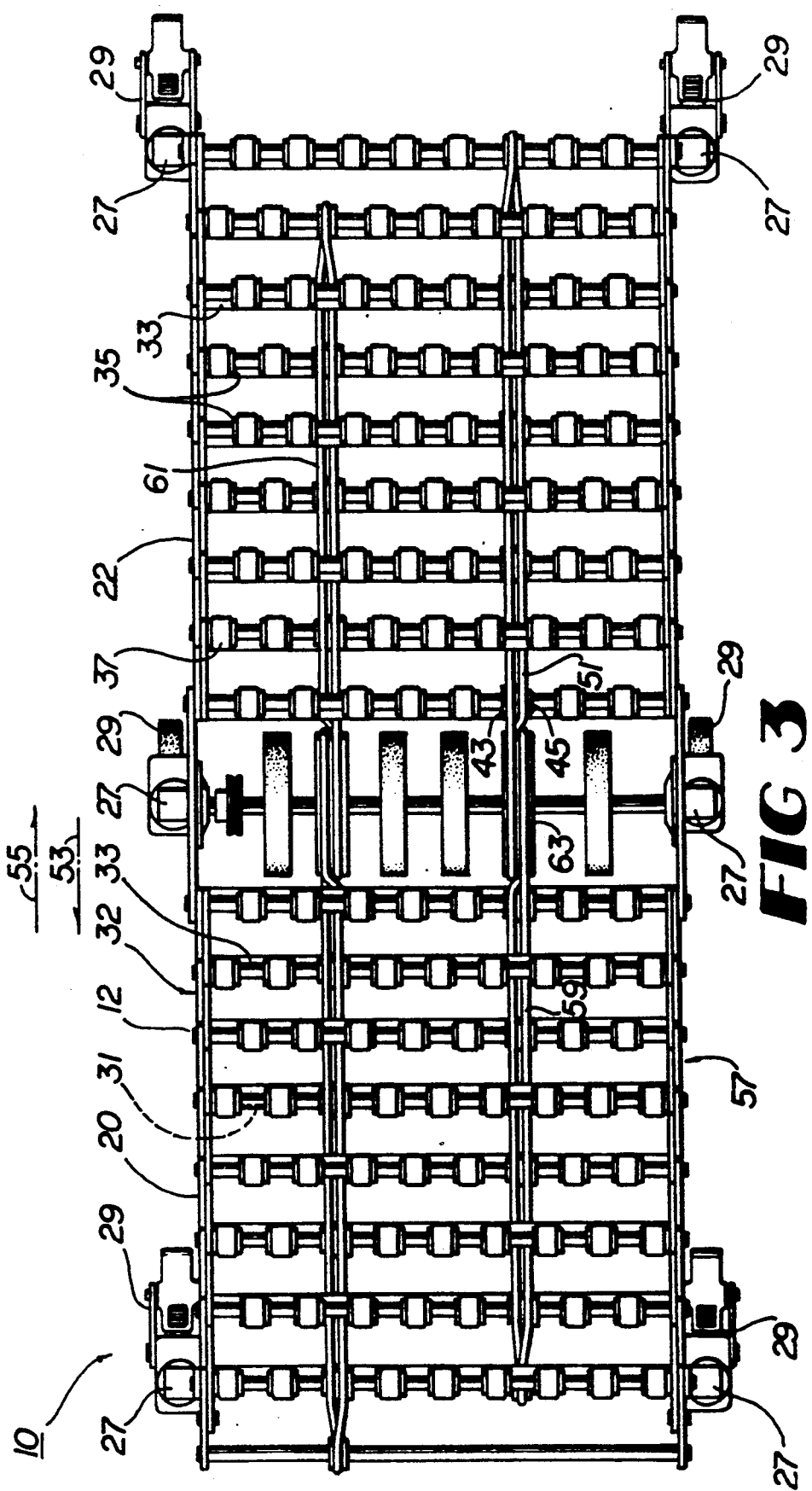
FIG. 3 is a top plan view of the conveyor of FIG. 1.

As shown in FIG. 3, one or more of rollers 37 may be replaced by a pair of grooved rollers, whose grooves conform generally in dimension to the surface of the belt: a drive roller 43 and a guide roller 45. Also attached to each brace 33 in this version of the conveyor is a follower support which preferably extends downwardly from brace 33 in a direction which allows it to parallel bars 22 in one of the sets 23 or 25 of the lazy tong structures 20. A pair of followers 49 are mounted, preferably rotatably, to the follower support at a distance from axle 31, and the centers of drive and guide rollers 43 and 45, to substantially equal the distance between top and bottom pivotal connections 24 and 25 of bars 22. Followers 49 need not be rotatably attached to support 47; they may simply be served as guides for drive belts, as hereinafter described, in a nonrotatable fashion, or they may contain rotatable parts for carrying the belts.

With reference, once again, to FIGS. 1 and 3, one or more drive belts 51 is carried by drive rollers 43, guide rollers 45, and followers 49. As shown in the those figures, a belt extends over drive rollers 43 in the drive direction 53, and over guide rollers 45 in the opposite, or return direction 55. The drive rollers 43 are preferably grooved, and are of diameter approximately sufficient to cause the drive belt 51 extending over it to be flush with the top tangents of rollers 37 forming the top surface 57 of conveyor 10. The guide rollers 45, which carry the belt 51 in the return direction, are of smaller diameter, so that the drive belt 51 does not contact articles on the top surface 57 of conveyor 10. The followers 49 may be of equivalent or different diameters, as desired.

FIG. 4 shows a drive belt 51 extending over successive drive rollers 43 and guide rollers 45, and under followers 49. FIG. 5 also illustrates, schematically, how this interlaced drive belt 51 configuration moves articles on the conveyor 10 despite the degree of retraction or expansion of conveyor 10. Essentially, each segment of belt 51 extending between a drive or guide roller 43 or 45 and its corresponding follower 49 remains constant length, because the axles of those rollers correspond substantially to top and bottom pivotal connections 2 and 26 of lazy tong structures 20. As the structure expands, the segments remain of substantially constant length, so that the entire loop formed by each drive belt 51 remains approximately the same length.

The conveyor of FIGS. 1 and 3 use two drive belts 51 which extend across drive and guide rollers 43 and 45 located on alternate axles 31 a shown perhaps most clearly in FIG. 3. The drive and guide rollers 43 and 45 for the first belt 59 are located on staggered alternate axles from the drive and guide rollers 43 and 45 of the second belt 61. Alternatively, the drive and guide rollers for each belt 59 and 61 may be located on the same alternating axles, rather than in a staggered relationship. Alternatively, only one belt could be used, or more than two could be used.

Figure 2:
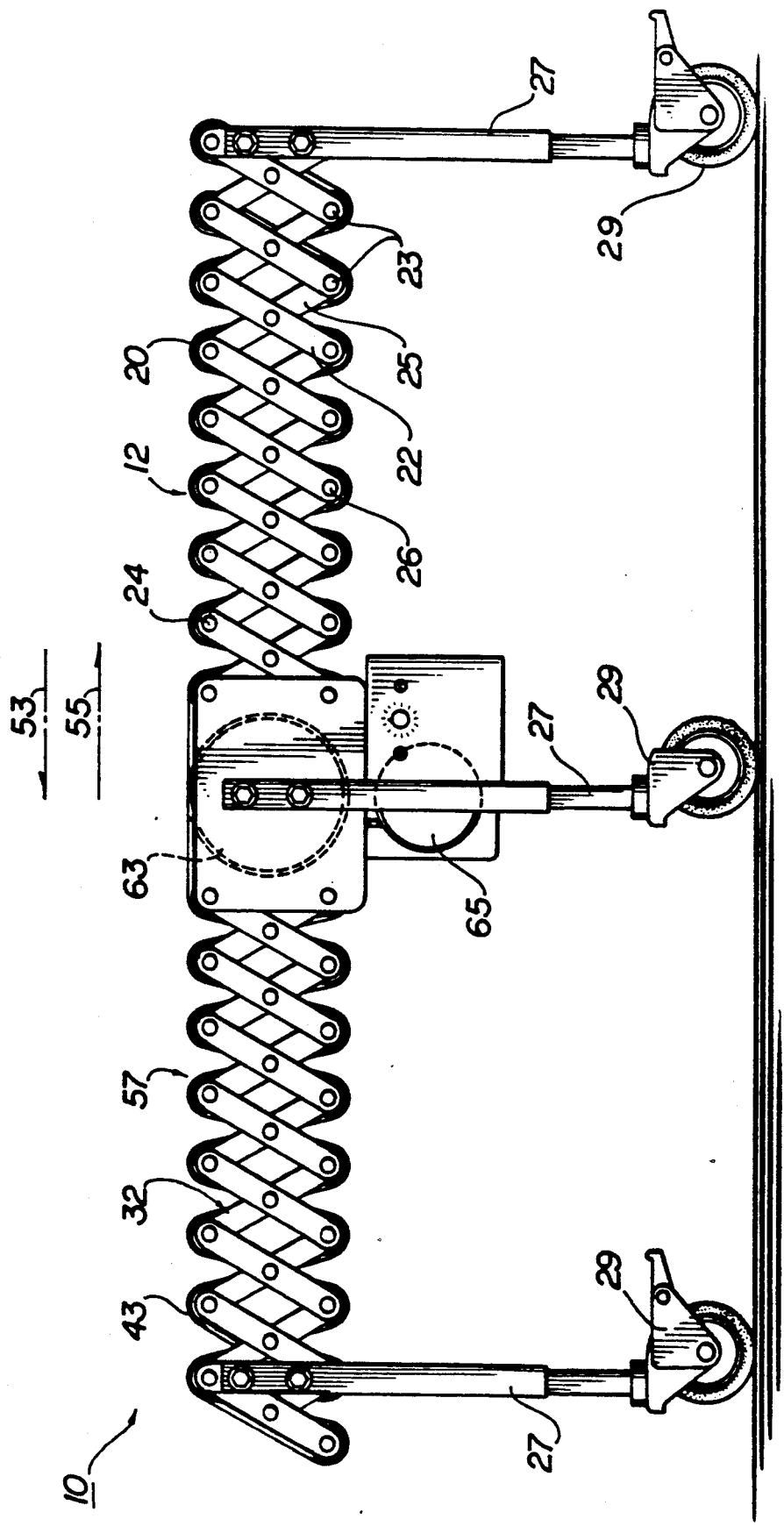
FIG. 2 is a side elevational view of a second embodiment of a conveyor according to the present invention which used no braces to support the rollers.

FIG. 4 also shows a drive pulley which pulls drive belts 51. Drive belts 51 may be formed of tubing material, which may be plastic or rubberized material, such as, for instance, polyurethane tubing. They may also be formed of chain, such as bicycle chain. Drive pulley 63 of which there may be a plurality, one or more for each belt 51, may be powered by a motor 65 via a sprocket and chain assembly connected to a transmission attached to the motor 65, or directly to the motor 65. Any alternative conventional method of connecting drive pulley 63 to motor 65 may be used. The drive means comprising the drive pulley 63, motor 65, and the connection between them, may be located in the midportion of the conveyor as shown in FIG. 2, at either end, or as otherwise desired.

In the conveyor which uses chains as drive belts 51, one or more idlers 71 for each chain may absorb slack in the chain and allow slack for safety purposes such as if and when a person's finger is inadvertently inserted under the chain. The idlers may be pivotally mounted to any appropriate structure in the conveyor structure, such as the lazy tongs structures 20 or braces 33, and biased against the chain using a spring or other resilient or biasing means. Each idler preferably comprises an elongated member connected at or near one extremity pivotally to the frame, and the other extremity connected to a sheave or roller over (or under) which the chain may ride.

Use of braces 33 and roller clips 35 are not required in the present invention. Drive and guide rollers 43 and 45 can simply be mounted on axles 31 on conventional expandable, flexible conveyors, and followers can be mounted on axles spanning bottom connections 26 of the lazy tong structures 22, and or otherwise attached to frame 32 formed of axles 31 and their supporting structures such as lazy tong structures 20. Similarly, the present invention can be employed to power nonexpandable and/or nonflexible conveyors which use no lazy tong structures 20, but instead C-beams or I-beams or similar structural longitudinal members to support axles 31 and rollers 37.

Conveyors of the present invention may also feature rollers 37 in the form of long, tubular rollers (not shown) rather than skate-wheel type rollers. The long rollers feature, and are thus connected to, at one or both ends, or elsewhere if desired, pulleys or sheaves for receiving drive belts 51, preferably in the form of chain or tubing as discussed above. The sheaves, like rollers 43 and 45, feature a groove which conform generally in dimension to the surface of the belts 51. The belts 51 are arranged and powered generally as discussed above, as will be apparent to a person having ordinary skill in this art. One primary conceptual difference between the long roller and the skate wheel type conveyors is that in the long roller version, the rollers themselves apply force to articles on the conveyor, while in the skate wheel version, the chain or tubing preferably applies such force.

The present invention is provided for purposes of illustration and explanation of a preferred embodiment of the present invention. Modifications and adaptations to the disclosed embodiments will be apparent to those of ordinary skill in the art and they may be made without departing from the scope or spirit of the invention.

What is claimed is:

1. A conveyor structure comprising:
   (a) a frame comprising:
      (1) a plurality of lazy tong structures, each comprising a plurality of bars connected to each other;
      (2) a plurality of axles connected to the lazy tong structures;
   (b) at least one roller connected to each axle;
   (c) a plurality of drive sheaves, each supported by an axle and each containing a groove conforming substantially to the surface dimensions of a drive belt that is used to power the conveyor structure;
   (d) at least one guide roller rotatably mounted on at least one of the axles adjacent to the drive sheaves;
   (e) at least two followers connected to the conveyor structure and corresponding to a drive sheave and a guide roller;
   (f) at least one drive belt extending over the drive sheaves and guide rollers and under the followers, in a continuous loop; and
   (g) a drive means connected to the belt to pull the belt over the drive sheaves and guide rollers and transport articles over the rollers on the conveyor structure.

2. A conveyor structure according to claim 1 in which the rollers are skate wheel rollers.

3. A conveyor structure according to claim 1 in which each drive belt is a chain.

4. A conveyor structure according to claim 1 in which each drive belt comprises tubing.

5. A conveyor structure according to claim 3 further comprising at least one idler connected to the frame for adjusting tension in the chain.

6. A conveyor structure comprising:
   (a) a frame comprising:
      (1) a plurality of lazy tong structures, each comprising a plurality of bars connected to each other;
      (2) a plurality of axles connected to the lazy tong structures;
   (b) at least one roller connected to each axle;
   (c) a plurality of drive sheaves, each supported by an axle;
   (d) at least one guide roller rotatably mounted on at least one of the axles adjacent to the drive sheaves;
   (e) at least two followers connected to the conveyor structure and corresponding to a drive sheave and a guide roller;
   (f) at least one drive belt extending over the drive sheaves and guide rollers and under the followers, in a continuous loop;
   (g) at least one idler connected to the conveyor structure for adjusting tension in the chain; and
   (h) a drive means connected to the belt to pull the belt over the drive sheaves and guide rollers and transport articles over the rollers on the conveyor structure.

7. A conveyor structure comprising:
   (a) a frame comprising:
      (1) a plurality of lazy tong structures, each comprising a plurality of bars connected to each other;
      (2) a plurality of axles extending between the lazy tong structures;
   (b) a plurality of rollers rotatably mounted on each axle;
   (c) at least one drive roller rotatably mounted on a plurality of the axles;
   (d) a guide roller rotatably mounted on each axle on which a drive roller is attached, adjacent to the drive roller;
   (e) a plurality of follower supports extending from the frame;
   (f) two followers mounted to each support and corresponding to a drive roller and a guide roller;
   (g) a drive belt extending over the drive roller and guide rollers and under the followers, in a continuous loop; and
   (h) a drive means connected to the belt to pull the belt over the drive rollers and guide rollers and transport articles over the rollers on the conveyor structure.

8. A conveyor structure according to claim 7 in which the drive means comprises a pulley which is connected to the drive belt, and a motor connected to the pulley.

9. A conveyor structure, comprising:
   (a) a frame comprising:
      (1) a plurality of generally parallel support structures;
      (2) a plurality of axles extending between the support structures;
   (b) a plurality of rollers rotatably mounted on each axle;
   (c) at least one drive roller rotatably mounted on at least one of the axles;
   (d) at least one guide roller rotatably mounted on at least one of the axles adjacent to the drive roller;
   (e) a plurality of follower supports extending from the frame;
   (f) at least two followers mounted to each support and corresponding to a drive roller and a guide roller;

(g) a drive belt extending over the drive rollers and under the followers, in a continuous loop; and (h) a drive means connected to the belt to pull the belt over the drive rollers and transport articles over the rollers on the conveyor structure.

10. A conveyor structure, comprising:
 (a) a frame comprising:
  (1) a plurality of lazy tong structures; each comprising a plurality of bars connected to each other;
  (2) a plurality of axles extending between the lazy tong structures;
 (b) a plurality of rollers rotatably mounted on each axle;
 (c) at least one drive roller rotatably mounted on alternate axles, so that the axles support at least two rows of substantially aligned drive rollers;
 (d) a plurality of guide rollers rotatably mounted on the axles which bear the drive rollers, each guide roller mounted adjacent to a drive roller;
 (e) a plurality of follower supports extending from the frame;
 (f) at least one follower mounted to each support and corresponding to a drive roller;
 (g) at least one additional follower mounted to each support and corresponding to a guide roller;
 (h) at least two drive belts, each extending over a plurality of drive rollers and under a plurality of followers in a continuous loop; and
 (i) a drive means connected to the belt to pull the belt over the drive rollers and transport articles over the rollers on the conveyor structure.

11. A conveyor structure according to claim 10 in which each axle carries at least one drive roller.

12. A conveyor structure according to claim 10 in which alternating axles carry no drive rollers.

13. A conveyor structure according to claim 10 in which a plurality of the axles carry at least two drive rollers.

14. A conveyor structure, comprising:
 (a) a frame comprising:
  (1) a plurality of lazy tong structures; each comprising a plurality of bars connected to each other;
  (2) a plurality of axles extending between the lazy tong structures;
 (b) a plurality of rollers rotatably mounted on each axle;
 (c) at least two drive rollers rotatably mounted on alternate axles, so that the axles support at least two rows of substantially aligned drive rollers;
 (d) at least two guide rollers rotatably mounted on the axles which bear the drive rollers, each guide roller mounted adjacent to a drive roller;
 (e) a plurality of follower supports extending from the frame;
 (f) at least two followers mounted to each support, each corresponding to a drive roller;
 (g) at least two additional followers mounted to each support, each corresponding to a guide roller;
 (h) at least two drive belts, each extending over a plurality of drive rollers and under a plurality of followers in a continuous loop; and
 (i) a drive means connected to the belt to pull the belt over the drive rollers and transport articles over the rollers on the conveyor structure.

15. A conveyor structure, comprising:
 (a) a plurality of lazy tong structures each comprising a plurality of bars connected to each other;
 (b) a plurality of roller support braces, each spanning two lazy tong structures and connected to two corresponding bars in the lazy tong structures and, for each brace;
  (i) a plurality of roller supports connected to the brace;
  (ii) an axle extending through the roller supports on the brace and connecting two bars in each lazy tong structure; and
  (iii) a roller rotatably mounted on each roller support and supported by the roller support and the axle;
 (c) a plurality of follower supports, each extending from a roller support brace;
 (d) a plurality of drive rollers, each of which is mounted on a roller support and supported by the roller support and an axle;
 (e) a plurality of guide rollers, each of which is mounted on a roller support and supported by the roller support and an axle;
 (f) a plurality of followers, mounted to the follower supports;
 (g) at least one drive belt extending over a plurality of the drive rollers and under a plurality of the followers, in a continuous loop; and
 (h) drive means connected to the drive belt for pulling the drive belt over the drive rollers.

16. A conveyor structure, comprising:
 (a) a plurality of lazy tong structures each comprising a plurality of bars connected to each other;
 (b) a plurality of roller support braces, each spanning two lazy tong structures and connected to two corresponding bars in the lazy tong structures and, for each brace;
  (i) a plurality of roller supports connected to the brace;
  (ii) an axle extending through the roller supports on the brace and connecting two bars in each lazy tong structure; and
  (iii) a roller rotatably mounted on each roller support and supported by the roller support and the axle;
 (c) at least one drive roller and guide roller mounted on a plurality of the axles;
 (d) a plurality of follower supports, each of which is attached to one of the braces;
 (e) a plurality of followers, attached to the follower supports;
 (f) at least one drive belt extending over a plurality of the drive and guide rollers and under a plurality of the followers in a continuous loop; and
 (g) drive means connected to the drive belt for pulling the drive belt over the drive rollers.

17. A conveyor structure according to claim 16 in which the drive means comprises at least one drive pulley, which pulley is connected to a drive belt and a sprocket; and a motor connected to the drive belt pulley sprocket by means that includes a chain.

18. A conveyor structure according to claim 16 in which the drive rollers are mounted on alternate axles, so that the roller supports and axles support at least one row of substantially aligned drive rollers.

19. A conveyor structure according to claim 18 in which at least two drive rollers are mounted on the alternate axles.

20. A conveyor structure according to claim 18 in which a plurality of drive rollers are mounted on a first set of alternating axles, and a plurality of drive rollers are mounted on a second set of alternating axles, so that the roller supports and axles support at least two rows of substantially aligned drive rollers in staggered relationship to one another.

21. A conveyor structure, comprising:
 (a) a plurality of lazy tong structures each comprising a plurality of bars connected to each other;
 (b) a plurality of roller support braces, each spanning two lazy tong structures and connected to two corresponding bars in the lazy tong structures and, for each brace;
  (i) a plurality of roller supports connected to the brace;
  (ii) an axle extending through the roller supports on the brace and connecting two bars in each lazy tong structure; and
  (iii) a roller rotatably mounted on each roller support and supported by the roller support and the axle;
 (c) at least two drive rollers rotatably mounted on alternate axles, so that the axles support at least two rows of substantially aligned drive rollers;
 (d) a plurality of guide rollers rotatably mounted on the axles which bear the drive rollers, each guide roller mounted adjacent to a drive roller;
 (e) a plurality of follower supports extending from the brackets;
 (f) a plurality of followers mounted to the supports and corresponding to drive and guide rollers;
 (g) at least two drive belts, each extending over a plurality of drive rollers and under a plurality of followers in a continuous loop; and
 (h) drive means connected to the belts to pull the belts over the drive rollers and transport articles over the rollers on the conveyor structure.

22. A conveyor structure according to claim 21 in which each axle carries at least one drive roller.

23. A conveyor structure according to claim 21 in which alternating axles carry no drive rollers.

24. A conveyor structure according to claim 21 in which a plurality of the axles carry at least two drive rollers.

25. A conveyor structure, comprising:
 (a) a plurality of lazy tong structures each comprising a plurality of bars connected to each other;
 (b) a plurality of roller support braces, each spanning two lazy tong structures and connected to two corresponding bars in the lazy tong structures and, for each brace;
  (i) a plurality of roller supports connected to the brace;
  (ii) an axle extending through the roller supports on the brace and connecting two bars in each lazy tong structure; and
  (iii) a roller rotatably mounted on each roller support and supported by the roller support and the axle;
 (c) at least two drive rollers rotatably mounted on alternate axles, so that the axles support at least two rows of substantially aligned drive rollers;
 (d) at least two guide rollers rotatably mounted on the axles which bear the drive rollers, each guide roller mounted adjacent to a drive roller;
 (e) a plurality of follower supports extending from the brackets;
 (f) a plurality of followers mounted to the supports, each corresponding to a drive or guide roller;
 (g) at least two drive belts, each extending over a plurality of drive rollers and under a plurality of followers, in a continuous loop; and
 (h) drive means connected to the belts to pull the belts over the drive rollers and transport articles over the rollers on the conveyor structure.

* * * * *

UNITED STATES PATENT AND TRADEMARK OFFICE
CERTIFICATE OF CORRECTION

PATENT NO. : 5,147,025

DATED : September 15, 1992

INVENTOR(S) : Bobby K. Flippo

It is certified that error appears in the above-identified patent and that said Letters Patent is hereby corrected as shown below:

Column 2, line 27, delete "includes" and insert --include--

Column 2, line 52, delete "used" and insert --uses--

Column 4, line 21, delete "2" before the word "and", and insert --24--

Column 6, line 14, delete "drive belt" and insert --chain--

Column 6, line 41, delete "roller" and insert --rollers--

Column 6, line 63, delete "roller" and insert --rollers--

Column 7, line 31, delete "belt" in two places and insert --belts-- in both places Column 7, line 43, delete ";" and insert --,--

Column 7, line 65, delete "belt" in two places and insert --belts-- in both places

UNITED STATES PATENT AND TRADEMARK OFFICE
CERTIFICATE OF CORRECTION

PATENT NO. : 5,147,025

DATED : September 15, 1992

INVENTOR(S) : Bobby K. Flippo

It is certified that error appears in the above-identified patent and that said Letters Patent is hereby corrected as shown below:

Column 8, line 6, delete ";" and insert --:--

Column 9, line 14, delete ";" and insert --:--

Column 9, line 37, insert the word --a-- before the word "drive"

Signed and Sealed this

Twenty-first Day of December, 1993

Attest:

BRUCE LEHMAN

*Attesting Officer*     Commissioner of Patents and Trademarks